(12) United States Patent
Machino

(10) Patent No.: US 8,825,380 B2
(45) Date of Patent: Sep. 2, 2014

(54) NAVIGATION APPARATUS

(75) Inventor: Hiroshi Machino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1040 days.

(21) Appl. No.: 12/519,274

(22) PCT Filed: Oct. 10, 2007

(86) PCT No.: PCT/JP2007/069759
§ 371 (c)(1),
(2), (4) Date: Jun. 15, 2009

(87) PCT Pub. No.: WO2008/093454
PCT Pub. Date: Aug. 7, 2008

(65) Prior Publication Data
US 2010/0094538 A1 Apr. 15, 2010

(30) Foreign Application Priority Data

Jan. 31, 2007 (JP) ................. 2007-021444

(51) Int. Cl.
G01C 21/34 (2006.01)
G08G 1/0968 (2006.01)
G01C 21/36 (2006.01)

(52) U.S. Cl.
CPC ...... *G01C 21/3658* (2013.01); *G08G 1/096838* (2013.01); *G08G 1/096894* (2013.01); *G08G 1/096827* (2013.01); *G08G 1/096866* (2013.01); *G01C 21/3461* (2013.01)
USPC ........... 701/423; 701/411; 701/418; 701/425; 340/995.19; 340/995.24

(58) Field of Classification Search
USPC ......... 701/117, 118, 119, 410, 411, 418, 425, 701/423; 340/995.1, 995.14, 995.19, 340/995.24
See application file for complete search history.

(56) References Cited

U.S. PATENT DOCUMENTS

| 6,014,607 | A | * | 1/2000 | Yagyu et al. | 701/533 |
| 6,295,503 | B1 | * | 9/2001 | Inoue et al. | 701/410 |
| 6,415,225 | B1 | * | 7/2002 | Hiyokawa et al. | 701/428 |
| 6,804,604 | B2 | * | 10/2004 | Yamazaki | 701/428 |
| 7,194,356 | B2 | * | 3/2007 | Sano | 701/428 |

(Continued)

FOREIGN PATENT DOCUMENTS

| JP | 5-164566 A | 6/1993 |
| JP | 2000-131085 A | 5/2000 |
| JP | 2001-59730 A | 3/2001 |

(Continued)

*Primary Examiner* — Thomas G Black
*Assistant Examiner* — Peter D Nolan
(74) *Attorney, Agent, or Firm* — Birch, Stewart, Kolasch & Birch, LLP

(57) ABSTRACT

A navigation apparatus includes a route searching unit 130 for performing both a route search with car pool lanes being made usable between a current position detected by a current position detecting unit and a destination inputted by an input means, and a route search with car pool lanes being made unusable, a display means 2 for displaying either a route which uses a car pool lane or a route which does not use any car pool lane on the basis of route data showing the routes acquired through the route searches by the route searching unit, and a control unit 10 for switching between the route which uses a car pool lane and the route which does not use any car pool lane to display either of them on the display means according to an instruction inputted by the input means.

8 Claims, 6 Drawing Sheets

(56) References Cited

U.S. PATENT DOCUMENTS

| | | | |
|---|---|---|---|
| 7,463,973 B2* | 12/2008 | Okude et al. | 701/423 |
| 7,801,678 B2* | 9/2010 | Sano | 701/411 |
| 8,126,641 B2* | 2/2012 | Horvitz | 701/414 |
| 2001/0021895 A1* | 9/2001 | Yamazaki | 701/211 |
| 2003/0225508 A9* | 12/2003 | Petzold et al. | 701/201 |
| 2005/0055158 A1 | 3/2005 | Machino | |
| 2005/0071080 A1 | 3/2005 | Sano | |
| 2006/0116818 A1* | 6/2006 | Chao et al. | 701/211 |
| 2006/0253249 A1* | 11/2006 | Bruelle-Drews | 701/209 |
| 2007/0021905 A1* | 1/2007 | Takashima et al. | 701/201 |
| 2008/0208448 A1* | 8/2008 | Geelen et al. | 701/201 |

FOREIGN PATENT DOCUMENTS

| | | |
|---|---|---|
| JP | 2001-183159 A | 7/2001 |
| JP | 2002-22469 A | 1/2002 |
| JP | 2004-157125 A | 6/2004 |
| JP | 2004-185504 A | 7/2004 |
| JP | 2005-61988 A | 3/2005 |
| JP | 2005-83758 A | 3/2005 |
| JP | 2005-189056 A | 7/2005 |
| WO | WO-2006/070583 A1 | 7/2006 |

* cited by examiner

FIG. 5

| HOV Setting | | | Map | |
|---|---|---|---|---|
| | Entrance | | Exit | |
| Restriction Enable or Disable: | Yes | No | Yes | No |
| Number of Passengers: | ◄ 2 ► | | ◄ 2 ► | |
| Lanes: | ◄ Five Lanes ► | | ◄ Five Lanes ► | |
| Vehicle Type: | ◄ Truck ► | | ◄ Truck ► | |
| Day of Week Setting: | ◄ Weekday ► | | ◄ Weekday ► | |
| Toll Fee: | ◄ Free ► | | ◄ Free ► | |
| Time Zone Setting: | ◄ 7:00 ► | | ◄ 17:00 ► | |
| | ◄ 12:00 ► | | ◄ 19:00 ► | |
| Enter | Initial Setting | | | Return |

(a)

(b)

NAVIGATION APPARATUS

FIELD OF THE INVENTION

The present invention relates to a navigation apparatus which performs a route guidance along a route which is searched for and a guidance about the route. More particularly, it relates to a technology of searching for a route which uses a car pool lane.

BACKGROUND OF THE INVENTION

A conventional navigation apparatus displays the current position of a vehicle which is determined by a vehicle position calculating unit on a digital map (simply referred to as a "map" from here on) displayed on a display unit while superimposing the current position on the map. Furthermore, the conventional navigation apparatus searches for a recommended route from the current position of the vehicle which is determined by the vehicle position calculating unit to a destination inputted via an input unit, and displays the recommended route on the map. The conventional navigation apparatus then carries out a route guidance about the recommended route on the basis of the shapes of road links read from a recording medium.

By the way, recent years have seen increase in the number of cars owned by individuals and occurrence of traffic congestions in various parts of roads. Especially, most of vehicles traveling along a highway or expressway (simply referred to as a "highway" from here on in this specification) which is extending to a big city and which is used for commuting or the like are occupied by only one person and this results in increase in traffic congestions. In order to solve this problem, there have been constructed highways where traffic is restricted by law according to the conditions of vehicles including the number of passengers and vehicle types.

For example, a car pool lane (Car Pool Lane) which is adopted by a road system mainly seen in big cities of North American is an example. A car pool lane is also called an HOV lane (High Occupancy Vehicle Lane), and is a lane along which, for example, only vehicles in each of which two or more persons are riding are granted to travel. For example, a lane which is also provided on a highway is known as a car pool lane. A road system which adopts such a car pool lane provides users with a preferential treatment that makes it possible to arrive at the destination in a shorter time as long as they travel along a car pool lane so as to prod users to share a vehicle with one or more persons, thereby reducing the traffic as a whole and therefore reducing traffic congestions.

As a technology relevant to such a car pool lane, patent reference 1 discloses a vehicle-mounted navigation apparatus which searches for a recommended route in consideration of the number of passengers. This vehicle-mounted navigation apparatus has a storage unit for storing map data including link data about each link which constructs a road on a map. As for a car pool link on which restrictions of prohibiting a vehicle which is not occupied by two or more persons from traveling are imposed, the vehicle-mounted navigation apparatus uses link data including information showing that such restrictions are imposed on the car pool link to search for a recommended route from the place of departure to the destination. Furthermore, when a car pool link is included in the constitution links which construct the recommended route, the vehicle-mounted navigation apparatus receives an input of the number of passengers, and searches for a recommended route from the place of departure to the destination by using the link data to exclude links along which the vehicle cannot travel because the received number of passengers does not meet a certain criterion.

Patent reference 2 discloses a route searching apparatus which can perform a search for a route in consideration of the conditions of a vehicle through an easy operation. This route searching apparatus is provided with a map data acquiring unit for acquiring map data defined by nodes and road links, a route searching unit for searching for a route to a destination before the conditions of the vehicle are set up, taking into consideration a road link corresponding to a particular road for which whether or not the vehicle can travel according to the conditions of the vehicle is determined, the road link being included in the map data acquired by the map data acquiring unit, and an output unit for outputting the route searched for by the route searching unit.

[Patent reference 1] JP, 2005-061988,A
[Patent reference 2] JP, 2005-083758,A

A conventional navigation apparatus which can select whether to use a car pool lane as a search condition before performing a route search is known. However, there is a case in which while driving along a highway, the user would like to switch to a "route using" car pool lanes or a "route not using" car pool lanes after recognizing the road state of the highway. The conventional navigation apparatus is required to, in such a case, promptly present a "route using" car pool lanes or a "route not using" car pool lanes for the user in response to the user's prompt or easy operation.

The present invention is made in order to meet the above-mentioned requirement, and it is therefore an object of the present invention to provide a navigation apparatus which can promptly present a route using car pool lanes or a route not using car pool lanes for a user in response to the user's prompt or easy operation.

DISCLOSURE OF THE INVENTION

In order to solve the above-mentioned problem, a navigation apparatus in accordance with the present invention includes a current position detecting unit for detecting a current position, an input means for inputting information, a route searching unit for performing a route search with car pool lanes being made usable between the current position detected by the current position detecting unit and a destination inputted by the input means, and for performing a route search with car pool lanes being made unusable, a display means for displaying either a route which uses a car pool lane or a route which does not use any car pool lane on the basis of route data showing the routes acquired through the route searches by the route searching unit, and a control unit for switching between the route which uses a car pool lane and the route which does not use any car pool lane to display either of them on the display means according to an instruction inputted by the input means.

As previously explained, the navigation apparatus in accordance with the present invention is constructed in such a way as to perform a route search with car pool lanes being made usable between the current position of the vehicle and the destination, and a route search with car pool lanes being made unusable, and switch between a display of a route which uses a car pool lane and a display of a route which does not use any car pool lane according to an instruction from the input means. Therefore, the user can switch to either the route which uses a car pool lane or the route which does not use any car pool lane quickly while driving his or her vehicle. As a result, the user can acquire a route having a high degree of travel efficiency promptly according to the traffic state, and can perform a safer and worry-free driving operation.

BRIEF DESCRIPTION OF THE FIGURES

FIG. 5 is a view showing an example of a car pool lane setup screen displayed in the navigation apparatus in accordance with Embodiment 1 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
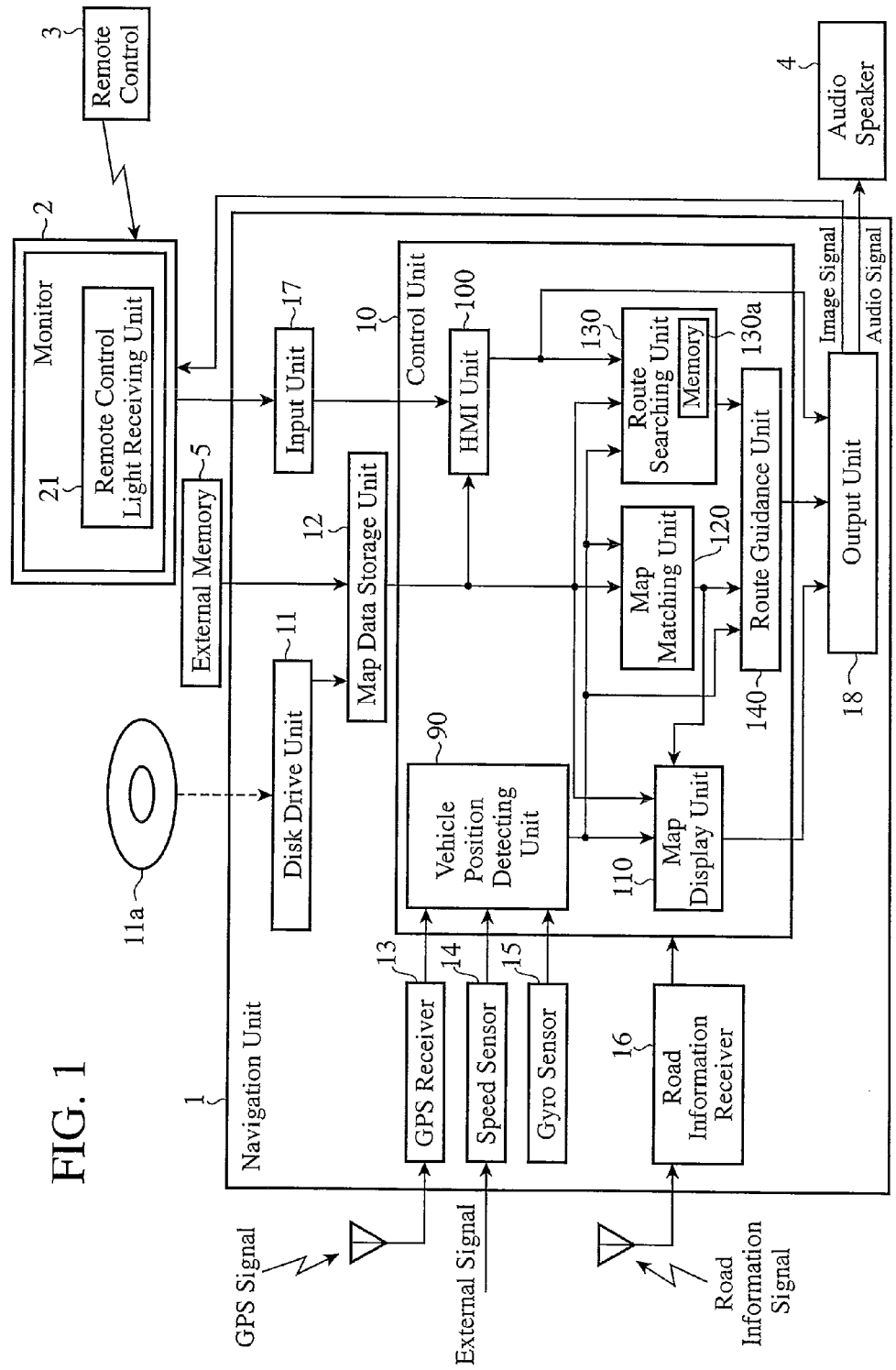
FIG. 1 is a block diagram showing the structure of a navigation apparatus in accordance with Embodiment 1 of the present invention.

FIG. 1 is a block diagram showing the structure of a navigation apparatus in accordance with Embodiment 1 of the present invention. This navigation apparatus is comprised of a navigation unit 1, a monitor 2, a remote controller (abbreviated as a "remote control" from here on) 3, an audio speaker 4, and an external memory 5.

The navigation unit 1 forms the heart of the navigation apparatus, and carries out processes, such as a map display, a route search, a route display, and a route guidance. Especially, a process of simultaneously performing a search for a route using car pool lanes and a search for a route not using any car pool lanes, which is a feature of the present invention, is also performed by this navigation unit 1. The details of this navigation unit 1 will be mentioned below.

The monitor 2 corresponds to a part of a display means and a search condition setting means in accordance with the present invention. This monitor 2 is comprised of, for example, an LCD (Liquid Crystal Display), and displays a map, a vehicle position mark, a recommended route to a destination, and various other messages according to an image signal sent thereto from the navigation unit 1. A remote control light receiving unit 21 is disposed in this monitor 2. The remote control light receiving unit 21 receives a light signal sent thereto from the remote control 3, and sends the light signal, as an input signal, to the navigation unit 1.

The remote control 3 corresponds to a part of an input means and the search condition setting means in accordance with the present invention. This remote control 3 is used by the user to scroll a map displayed on the monitor 2, to input a destination, to instruct switching between a route using car pool lanes and a route not using car pool lanes, and to answer a message for urging the user to do a certain operation which is outputted from the monitor 2 or the audio speaker 4. Instead of the remote control 3 or together with the remote control 3, a touch panel can be disposed for enabling the user to directly touch a touch sensor mounted on the screen of the monitor 2 to input various pieces of information.

The audio speaker 4 outputs, by voice, a route guidance message including a guidance about car pool lanes according to an audio signal sent thereto from the navigation unit 1. The external memory 5 is optional, and is comprised of, for example, an HDD (Hard Disk Drive). Map data similar to map data stored in a recording medium 11a inserted into a disk drive unit 11 which will be mentioned below are stored in this external memory 5. Use of this external memory 5 makes it possible to access the map data at a high speed, as well as to store a lot of map data.

Next, the details of the navigation unit 1 will be explained. The navigation unit 1 is comprised of a control unit 10, a disk drive device 11, a map data storage unit 12, a GPS (Global Positioning System) receiver 13, a speed sensor 14, a gyro sensor 15, a road information receiver 16, an input unit 17, and an output unit 18.

When the recording medium 11a, such as a DVD (Digital Versatile Disc) or a CD (Compact Disc), in which a map database including map data is stored is inserted thereinto, the disk drive unit 11 plays back a content recorded in the recording medium. The map data are defined by nodes, road links, etc., and include link information, such as intersection construction links, destination area data, car pool lane data, and road number data. Whether or not a car pool lane is also provided is specified in a road link.

Car pool lane data include lane information (the position of a car pool lane in all lanes), information about the types of vehicles which can use the car pool lane (e.g., a general vehicle, a bus, a truck, an emergency vehicle, a hybrid vehicle, a motorcycle, and so on), information about the number of passengers which is required of the user to use the car pool lane, information about dates or days of the week on which vehicles can use the car pool lane, and a time zone in which vehicles can use the car pool lane, information about the toll fee of using the car pool lane, etc. The map data played back by this disk drive unit 11 are sent to the map data storage unit 12.

The map data storage unit 12 temporarily stores the map data sent thereto from the disk drive unit 11 or the external memory 5. The map data stored in this map data storage unit 12 are referred to by the control unit 10, and are used to display information about a car pool lane, a map, roads, various icons, other information, and so on, to make a route search, to provide a route guidance, etc. The map data storage unit 12 can consist of an HDD, and, in this case, the disk drive device 11 and the external memory 5 can be eliminated.

The GPS receiver 13 receives GPS signals from GPS satellites via an antenna. The GPS signals received by this GPS receiver 13 are sent to the control unit 10. The speed sensor 14 detects the traveling speed of the vehicle on the basis of an external signal sent thereto from the vehicle in which this navigation apparatus is mounted. A speed signal showing the traveling speed of the vehicle which is detected by this speed sensor 14 is sent to the control unit 10. The gyro sensor 15 detects the traveling direction of the vehicle. A direction signal showing the traveling direction of the vehicle which is detected by this gyro sensor 15 is sent to the control unit 10.

The road information receiver 16 receives a road information signal transmitted from, for example, an external road traffic data communications system. The road information signal received by this road information receiver 16 is sent to the control unit 10. The control unit 10 generates a message showing congestion information about congestions on roads on the basis of the road information signal received from the road information receiver 16, and notifies the message to the user via the monitor 2 and the audio speaker 4.

The input unit 17 receives and analyzes an input signal sent thereto, via the remote control light receiving unit 21, from the remote control 3, and sends the result of this analysis to the control unit 10 as a command.

The output unit 18 generates an image signal on the basis of drawing data sent thereto from the control unit 10, and also generates an audio signal on the basis of audio data sent thereto from the control unit 10. The image signal generated by this output unit 18 is sent to the monitor 2. As a result, a map, a vehicle position mark, a recommended route to the destination, an intersection guide figure, information about a car pool lane, etc. are displayed on the screen of the monitor 2. Furthermore, the audio signal generated by the output unit 18 is sent to the audio speaker 4. As a result, a guidance voice or the like is outputted from the audio speaker 4.

The control unit 10 is comprised of, for example, a microcomputer, and controls the whole of this navigation unit 1. This control unit 10 is comprised of a vehicle position detecting unit 90, a human-machine interface (abbreviated as "HMI" from here on) unit 100, a map display unit 110, a map matching unit 120, a route searching unit 130, and a route guidance unit 140. Each of these components is comprised of an application program which operates under the control of the microcomputer.

The vehicle position detecting unit 90 detects the current position of the vehicle on the basis of the GPS signals sent thereto from the GPS receiver 13, and also detects the current position of the vehicle with autonomous navigation on the basis of the speed signal sent thereto from the speed sensor 14 and the direction signal sent thereto from the gyro sensor 15. Because the navigation apparatus can detect the current position of the vehicle with autonomous navigation even if the navigation apparatus cannot receive the GPS signals from the GPS receiver 13 because, for example, the vehicle is traveling through a tunnel, the navigation apparatus can correctly detect the current position of the vehicle at any times. Current position data showing the current position of the vehicle which is detected by this vehicle position detecting unit 90 are sent to the map display unit 110, the map matching unit 120, the route searching unit 130, and the route guidance unit 140.

The HMI unit 100 processes a command sent thereto from a control panel not shown or the input unit 17 with reference to the map data stored in the map data storage unit 12. This HMI unit 100 carries out communications between the navigation apparatus and the user. The data processed by the HMI unit 100 are sent to the route searching unit 130 and the output unit 18.

The map display unit 110 reads map data about a map of an area surrounding a point shown by the current position data sent thereto from the vehicle position detecting unit 90 from the map data storage unit 12, and, on the basis of this map data and the data from the map matching unit 120, generates drawing data for displaying a map, a vehicle position mark, an intersection guidance figure, information about a car pool lane, a telop for notifying various pieces of information to the user, etc. on the screen of the monitor 2. The drawing data generated by this map display unit 110 are sent to the output unit 18.

The map matching unit 120 associates the vehicle position shown by the current position data sent thereto from the vehicle position detecting unit 90 with the map shown by the map data read from the map data storage unit 12 so as to form a vehicle position mark on the map. Data showing the vehicle position mark formed by the map matching unit 120 are sent to the map display unit 110 and the route guidance unit 140.

The route searching unit 130 searches for a recommended route from the current position of the vehicle shown by the current position data sent thereto from the vehicle position detecting unit 90 to a destination which is set up by the user by using the remote control 3 (information showing the destination is sent to the route searching unit via the following path: the remote control 3→the remote control light receiving unit 21→the input unit 17→the HMI unit 100) on the basis of the map data read from map data storage unit 12 and according to search conditions and car pool lane use conditions which are set up by the user by using the remote control 3. This route searching unit 130 performs both a route search with car pool lanes being made usable and a route search with car pool lanes being made unusable. Route data showing routes which are searched for by this route searching unit 130 are stored in a memory 130*a*. This memory 130*a* corresponds to a storage means of the present invention. The route data stored in the memory 130*a* are sent to the route guidance unit 140.

The route guidance unit 140 generates both drawing data for displaying a route guidance figure on the screen of the monitor 2 and audio data for outputting a voice guidance message by voice on the basis of the current position data sent thereto from the vehicle position detecting unit 90, the data showing the vehicle position mark sent thereto from the map matching unit 120, and the route data about the routes which are searched for by the route searching unit 130, and sends the drawing data and the audio data to the output unit 18.

Figure 2:
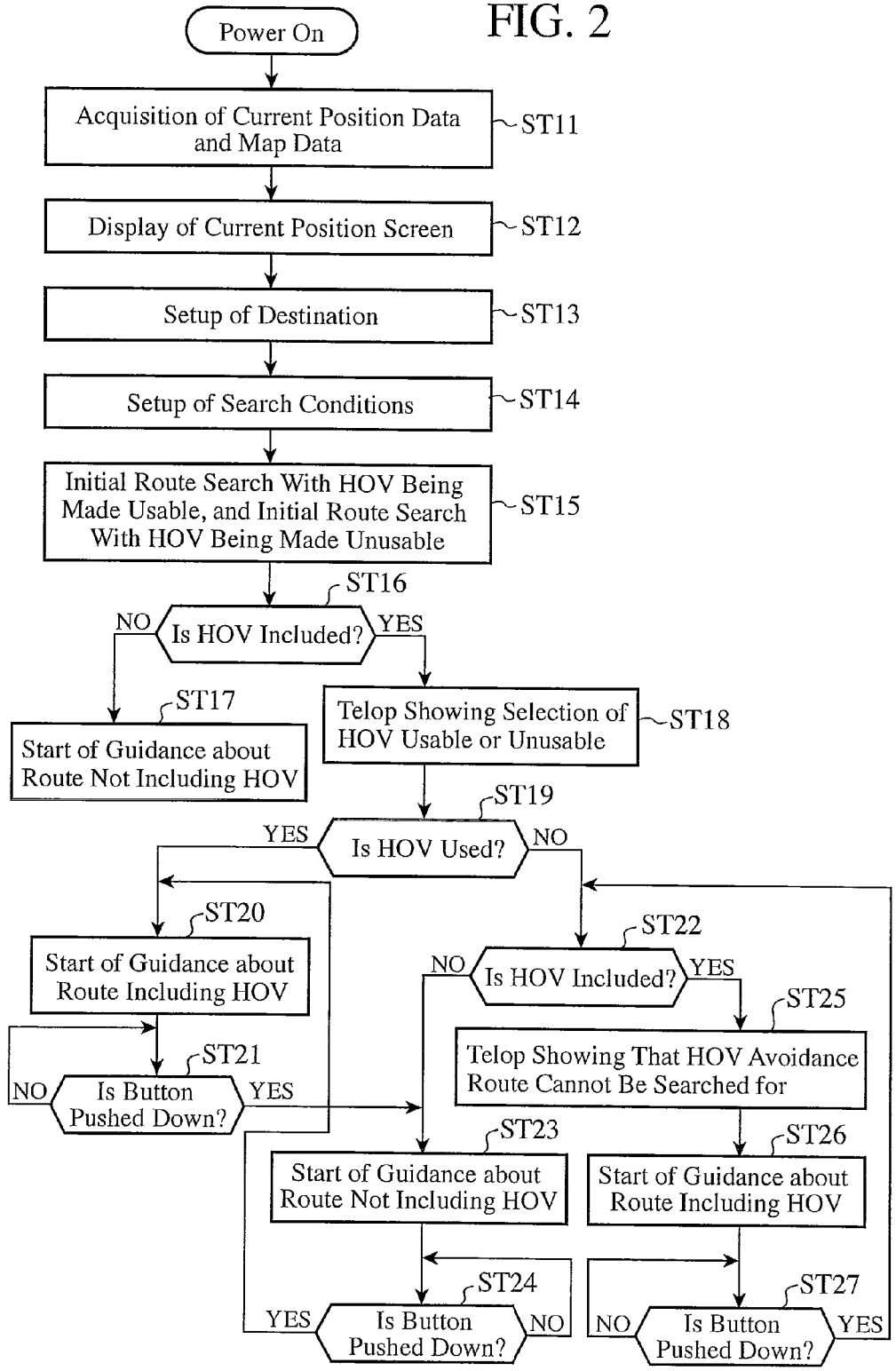
FIG. 2 is a flow chart showing the operation of the navigation apparatus in accordance with Embodiment 1 of the present invention.
Figure 3:
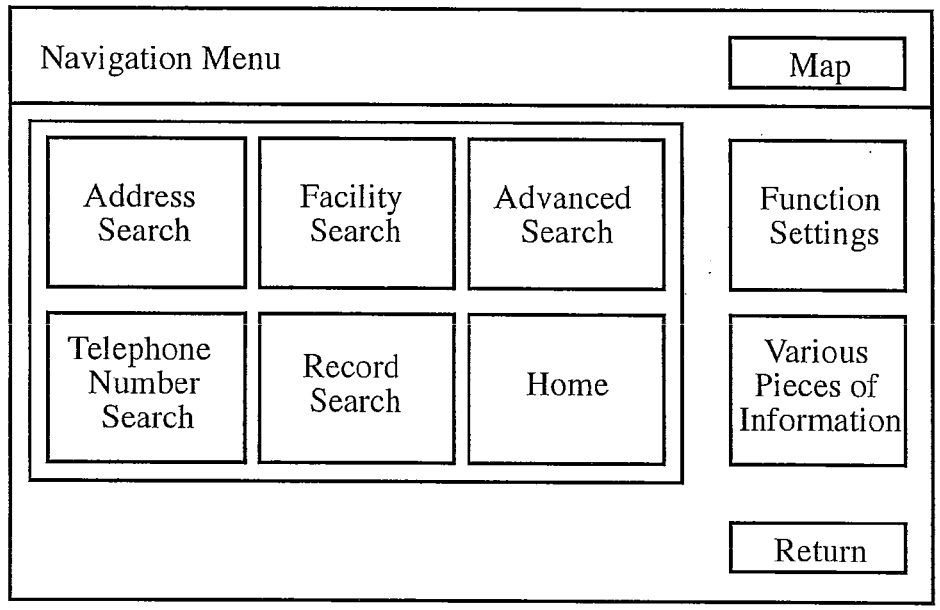
FIG. 3 is a view showing an example of a destination setup screen displayed in the navigation apparatus in accordance with Embodiment 1 of present invention.

Next, the operation of the navigation apparatus which is constructed as mentioned above will be explained focusing on the process of switching between a route using a car pool lane and a route not using any car pool lane which to display either of them on the screen of the monitor 2 with reference to a flow chart shown in FIGS. 2 and 3, and screen display examples shown in FIGS. 4 to 7.

When the user instructs the navigation apparatus to make a route search by using the remote control 3, the navigation apparatus acquires the current position data and map data first (step ST11). More specifically, the vehicle position detecting unit 90 sends either the current position data showing the position of the vehicle which the vehicle position detecting unit detects on the basis of the GPS signals acquired from the GPS receiver 13 or the current position data showing the position of the vehicle which the vehicle position detecting unit detects with autonomous navigation to the map matching unit 120. The disk drive unit 11 reads map data from the recording medium 11*a* set thereto, and stores the map data in the map data storage unit 12. The map matching unit 120 carries out a matching process of reading the map data from the map data storage unit 12, and superimposing a vehicle position mark on a map at a position corresponding to the current position data received from the vehicle position detecting unit 90. The map data on which this matching process is performed are sent to the map display unit 110 and the route guidance unit 140. The map display unit 110 generates drawing data on the basis of the map data sent thereto from the map matching unit 120, and sends the drawing data to the output unit 18. The output unit 18 generates an image signal on the basis of the drawing data received from the map display unit 110, and sends the image signal to the monitor 2.

A display of a current position screen is then produced (step ST12). More specifically, the monitor 2 draws a map whose center corresponds to the current position of the vehicle on the basis of the image signal received, via the output unit 18, from the map display unit 110. Thereby, the map whose center corresponds to the current position of the vehicle shown by the vehicle position mark is displayed, as the current position screen, on the monitor 2.

A setup of a destination is then performed (step ST13). More specifically, when the user performs an operation of instructing the navigation apparatus to set up a destination by using the remote control 3, the navigation apparatus displays a destination setup screen as shown in FIG. 3 on the monitor 2. In this destination setup screen, a portion enclosed by a rectangle is a button, and the user is enabled to make the navigation apparatus carry out a function allocated to the button by selecting a desired button by using the remote control 3. The same goes for each screen which will be explained hereafter. The user selects an address search, a facility name search, a phone number search, or the like by using the remote control 3 to set up a destination (and a via-place as needed) on the map displayed on the monitor 2. Data showing the destination which is set up by the user by using the remote control 3 are sent to the route searching unit 130 via the input unit 17 and the HMI unit 100 of the navigation unit 1.

Figure 4:
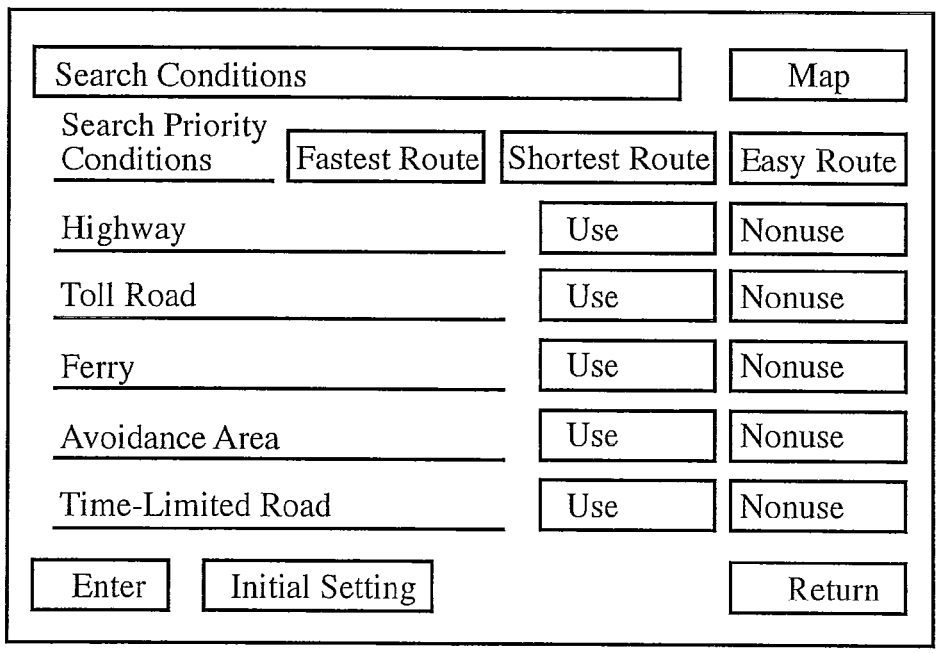
FIG. 4 is a view showing an example of a search condition setup screen displayed in the navigation apparatus in accordance with Embodiment 1 of the present invention.
Figure 6:
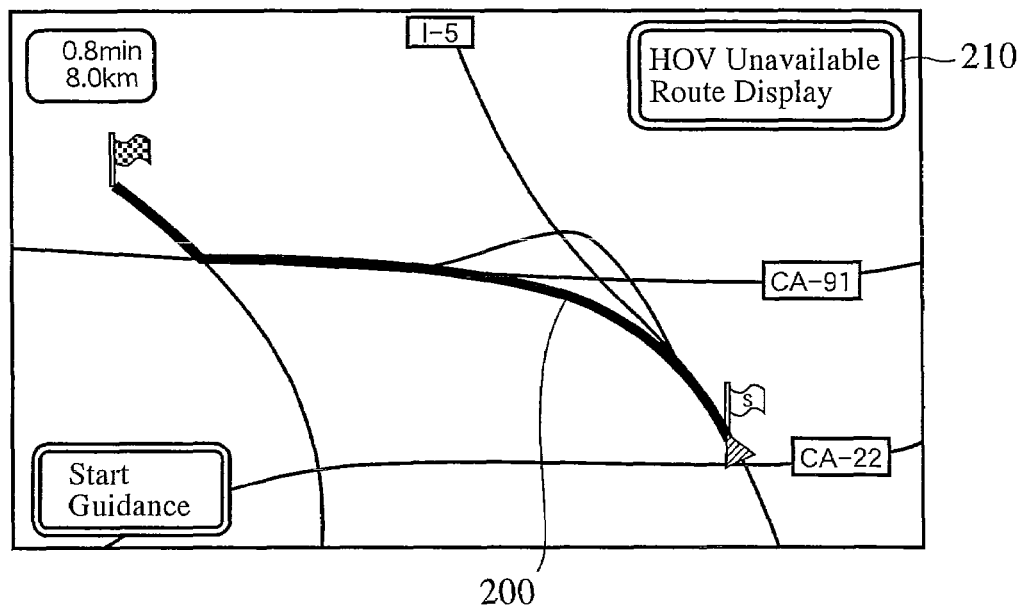
FIG. 6 is a view showing an example of a route guidance screen displayed in the navigation apparatus in accordance with Embodiment 1 of the present invention.
Figure 6:
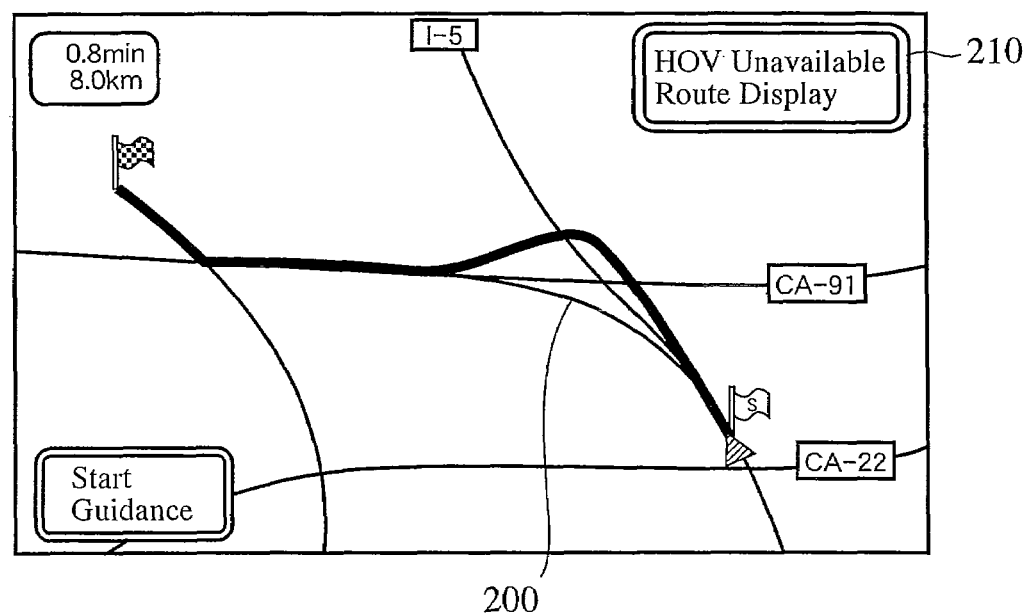

A setup of search conditions is then performed (step ST14). More specifically, when a setup of a destination in step ST13 is completed, the navigation apparatus displays a search condition setup screen as shown in FIG. 4 on the monitor 2. The user then sets up conditions for the route search which are displayed on the monitor 2 by using the remote control 3. Concretely, the user sets up a higher-priority search condition by pushing one of a button showing "fastest route", a button showing "shortest route", and a button showing "easy route", the buttons showing higher-priority conditions, respectively. The user also sets up whether the navigation apparatus can use each of the following items: a highway, a toll road, a ferry, an avoidance route area, and a time-limited road by pushing down a "use" button or a "nonuse" button.

A "map" button in the search condition setup screen shown in FIG. 4 is used in order to return the screen of the monitor 2 to the current position screen, an "enter" button is used in order to make the settings permanent, an "initial setting" button is used in order to return the search conditions to initial ones, and a "return" button is used in order to return the screen of the monitor to the previous screen. When the "enter" button in this search condition setup screen is pushed down, data showing the set-up search conditions are sent to the route searching unit 130 via the input unit 17 and the HMI unit 100 of the navigation unit 1. After that, the navigation apparatus shifts to a setup of car pool lanes.

For settings about car pool lanes, a car pool lane (HOV) setup screen as shown in FIG. 5 is displayed. The user sets up car pool lane use conditions by using this car pool lane setup screen. More specifically, the user sets up the following items: restriction enable or disable, a number of passengers, driving lanes, a vehicle type, a setting of days of week, a toll fee, and a time zone setting for each of an "entrance" and an "exit" of a car pool plane as needed. When each of the above-mentioned items is not changed, initial settings are adopted as the car pool lane use conditions.

Concretely, when making a setting for the item of "restriction enable or disable", the user pushes down a "Yes" button when imposing restrictions shown in each item displayed below the item, or pushes down a "No" button when not imposing any restrictions shown in each item displayed below the item. When making a setting for the item of "number of passengers", the user inputs the number of passengers who get on the vehicle. The user can change the number of passengers by pushing down either a button disposed on a left side of the display of the number-of-passengers item and having a leftward triangular mark attached thereto, or a button disposed on a right side of the display of the number-of-passengers item and having a rightward triangular mark attached thereto. The same goes for each of the other items.

Furthermore, when making a setting for the item of "driving lanes", the user sets up the number of driving lanes of a highway which the user uses. In addition, when making a setting for the item of "vehicle type", the user sets up a vehicle type which the user uses (a general vehicle, a bus, a truck, an emergency vehicle, a hybrid vehicle, a motorcycle, or the like). Furthermore, when making a setting for the item of "setting of days of the week", the user sets up days of the week on which the user uses the car pool lane. In addition, when making a setting for the item of "toll fee", the user sets up whether or not the car pool lane is a toll one. Furthermore, when making settings for the item of "time zone setting", the user sets up a time zone in which the user uses the car pool lane.

A "map" button in the car pool lane setup screen shown in FIG. 5 is used in order to return the screen of the monitor 2 to the current position screen, an "enter" button is used in order to make the settings permanent, an "initial setting" button is used in order to return the car pool lane use conditions to initial ones, and a "return" button is used in order to return the screen of the monitor to the previous screen. When the "enter button" on this car pool lane setup screen is pushed down, the monitor sends data showing the set-up car pool lane use conditions to the route searching unit 130 via the input unit 17 and the HMI unit 100 of the navigation unit 1. After that, the navigation apparatus advances the sequence to step ST15.

The navigation apparatus, in step ST15, performs both an initial route search with car pool lanes (HOV) being made usable, and an initial route search with car pool lanes (HOV) being made unusable simultaneously (according to a one-time instruction for making a route search). More specifically, the route searching unit 130 searches for routes from the current position determined by the current position data received from the vehicle position detecting unit 90 to the destination set up in step ST13 according to the search conditions and the car pool lane use conditions which are set up in step ST14. Data about the routes acquired through the initial route searches in this step ST15 are stored in the memory 130a so that the data will be used later.

The navigation apparatus then checks to see whether a car pool lane (HOV) is included in a route acquired through the route searches in step ST15 (step ST16). When, in this step ST16, judging that no car pool lane (HOV) is included in any searched-for route, the navigation apparatus starts a guidance about a route which does not include any car pool lane (HOV) (step ST17). More specifically, the route data which are, in step ST15, stored in the memory 130a are sent to the route guidance unit 140 as data showing the recommended route. As a result, the recommended route which is acquired through the initial route searches and which does not include any car pool lane is displayed on the monitor 2, and a route guidance is then started. More specifically, the route guidance unit 140 generates drawing data showing a guidance message including the recommended route on the basis of the data showing the recommended route and sends the drawing data to the output unit 18, and also generates audio data showing the guidance message and sends the audio data to the output unit 18. As a result, the guidance message including the recommended route is displayed on the monitor 2 and the voice guidance message is also outputted from the audio speaker 4. After that, guidance messages corresponding to the environments which vary as the vehicle travels are outputted in turn.

When, in above-mentioned step ST16, judging that a car pool lane (HOV) is included in a searched-for route, the navigation apparatus then shows a telop for making the user select whether or not the user can use the car pool lane (HOV) (step ST18). The navigation apparatus then checks to see whether the user has made a selection of using the car pool lane (HOV) (step ST19). When, in this step ST18, judging that the user has made a selection of using the car pool lane (HOV), the navigation apparatus starts a guidance about the route including the car pool lane (HOV) (step ST20). More specifically, the route data which are, in step ST15, stored in the memory 130a are sent to the route guidance unit 140 as data showing the recommended route. As a result, the recommended route including the car pool lane 200 as shown in FIG. 6(a) is displayed on the screen of the monitor 2, and a route guidance is started. FIG. 6(a) shows a display example in a case in which this navigation apparatus is used in the U.S. where car pool lanes exist at this time, and FIG. 6(b), which will be mentioned below, also shows a display example in the case in which this navigation apparatus is used in the U.S.

A button 210 for switching between a display of a route which does not use any car pool lane and a display of a route which uses a car pool lane is displayed on the screen on which the recommended route including the car pool lane 200 shown in FIG. 6(a) is displayed. While the recommended route including the car pool lane 200 is displayed, a message "HOV unavailable route display" showing that there exists a route which does not use any car pool lane is displayed on this button 210. The user can make the monitor switch to a screen, as shown in FIG. 6(b), in which the recommended route which does not include the car pool lane 200 is shown by pressing down the button 210 by using the remote control 3.

After starting a guidance about the route including the above-mentioned car pool lane (HOV), the navigation apparatus then checks to see whether or not the button 210 on the screen is pushed down (step ST21). When, in this step ST21, judging that the button 210 is not pushed down, the navigation apparatus repeatedly carries out this step ST21 and then enters a waiting state, and, in this waiting state, continues the guidance about the route including the car pool lane (HOV) and outputs guidance messages corresponding to the environments which vary as the vehicle travels in turn. In contrast, when, in step ST21, judging that the button 210 is pushed down, the navigation apparatus advances the sequence to step ST23, and starts a guidance about the route which does not include any car pool lane (HOV) as will be mentioned below.

When, in above-mentioned step ST19, the user has made a selection of not using the car pool lane (HOV), the navigation apparatus then checks to see whether a car pool lane (HOV) is included in the route acquired through the route search which the navigation apparatus, in step ST15, has performed with car pool lanes (HOV) being made unusable (step ST22). The reason why the navigation apparatus checks to see whether a car pool lane (HOV) is included in the route acquired through the route search which the navigation apparatus has performed with car pool lanes (HOV) being made unusable is that the navigation apparatus has to support a case in which the destination is set up as a point on a car pool lane and a case in which the current position is on a car pool lane.

When, in this step ST22, judging that any car pool lane (HOV) is not included in the route, the navigation apparatus starts a guidance about the route which does not include any car pool lane (HOV) (step ST23). More specifically, data about the route which has been acquired through the route searches in step ST15 are sent to the route guidance unit 140 as data showing the recommended route. As a result, the recommended route which does not include the car pool lane 200 as shown in FIG. 6(b) is displayed on the screen of the monitor 2, and a route guidance is started.

A button 210 for switching between a display of a route which does not use any car pool lane and a display of a route which uses a car pool lane is displayed on the screen on which the recommended route not including the car pool lane 200 shown in FIG. 6(b) is displayed, like in the case of the screen shown in FIG. 6(a). While the recommended route not including the car pool lane 200 is displayed, a message "HOV available route display" showing that there exists a route which uses a car pool lane is displayed on this button 210. The user can make the monitor switch to the screen, as shown in FIG. 6(a), in which the recommended route including the car pool lane 200 is shown by pressing down the button 210 by using the remote control 3.

After starting this guidance about the route not including any car pool lane (HOV), the navigation apparatus then checks to see whether or not the button 210 on the screen is pushed down (step ST24). When, in this step ST24, judging that the button 210 is not pushed down, the navigation apparatus repeatedly carries out this step ST24 and then enters a waiting state, and, in this waiting state, continues the guidance about the route not including any car pool lane (HOV) and outputs guidance messages corresponding to the environments which vary as the vehicle travels in turn. In contrast, when, in step ST24, judging that the button 210 is pushed down, the navigation apparatus advances the sequence to step ST20, and starts a guidance, as mentioned above, about the route including a car pool lane (HOV).

In contrast, when, in step ST22, judging that a car pool lane (HOV) is included in the route, the navigation apparatus then shows a telop for warning the user that any car pool lane (HOV) avoidance route cannot be searched for (step ST25). The navigation apparatus then starts a guidance about the route including a car pool lane (HOV) (step ST26). More specifically, data showing the route acquired through the route re-search in step ST22 are sent to the route guidance unit 140 as data showing the recommended route. As a result, the recommended route including the car pool lane 200 as shown in FIG. 6(a) is displayed on the screen of the monitor 2, and a route guidance is started.

The navigation apparatus then checks to see whether or not the button 210 on the screen shown in FIG. 6(a) is pushed down (step ST27). When, in this step ST27, judging that the button 210 is not pushed down, the navigation apparatus repeatedly carries out this step ST27 and then enters a waiting state, and, in this waiting state, outputs guidance messages corresponding to the environments which vary as the vehicle travels in turn.

In contrast, when, in step ST27, judging that the button 210 is pushed, the navigation apparatus returns the sequence to step ST22 and then repeats the above-mentioned processing. As a result, when, while driving the vehicle to travel along a route which uses a car pool lane, the user would like to stop the travel along the route which uses a car pool lane according to the current road conditions, and then pushes down the button 210 on the screen as shown in FIG. 6(a), the navigation apparatus checks to see the contents of the memory 130a, and, when recognizing that a car pool lane is included in the route, shows a telop for warning the user that any car pool lane (HOV) avoidance route cannot be searched for, and, after that, starts a guidance about the route including a car pool lane (HOV).

As previously explained, the navigation apparatus in accordance with Embodiment 1 of the present invention is constructed in such a way as to perform both a route search with car pool lanes being made usable between the current position of the vehicle and the destination, and a route search with car pool lanes being made unusable, and switch between a display of a route which uses a car pool lane and a display of a route which does not use any car pool lane according to an instruction from the remote control 3. Therefore, the user can change to either a route which uses a car pool lane or a route which does not use any car pool lane quickly. As a result, the user can acquire a route having a high degree of travel efficiency promptly according to the traffic state, and can perform a safer and worry-free driving operation.

Embodiment 2

A navigation apparatus in accordance with Embodiment 2 of the present invention is constructed in such a way as to display the shortest route, the fastest route, and an easy route one of which can be set up by the user on a route condition setup screen, in addition to a route which uses a car pool lane and a route which does not use any car pool lane, on the screen of a monitor 2.

The structure of the navigation apparatus in accordance with Embodiment 2 of the present invention is the same as that of the navigation apparatus in accordance with Embodiment 1 shown in FIG. 1.

Figure 7:
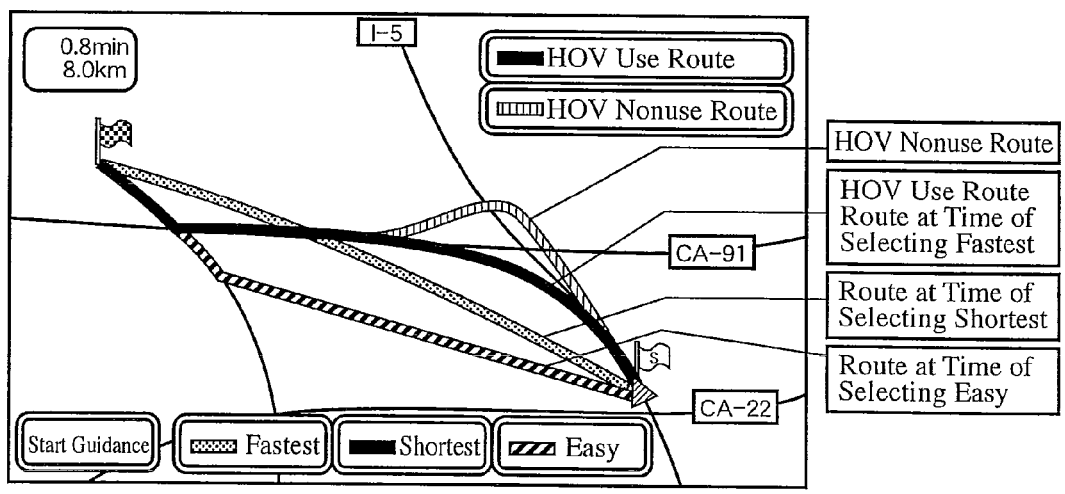
FIG. 7 is a view showing an example of a route guidance screen displayed in a navigation apparatus in accordance with Embodiment 2 of the present invention.

Next, the operation of the navigation apparatus in accordance with Embodiment 2 will be explained. This navigation apparatus, in step ST15 of the flow chart shown in FIG. 2, performs route searches from the following search conditions: fastest route search, shortest route search, and easy route search, in addition to both a route search with car pool lanes (HOV) being made usable and a route search with car pool lanes (HOV) being made unusable. All the routes acquired through the route searches as shown in FIG. 7 are displayed on the screen at the time of start of a route guidance. Concretely, an HOV nonuse route, an HOV use route, the fastest route, the shortest route, and an easy route are displayed.

The user can select an arbitrary one of the routes, i.e., a desired one of the routes by pushing down a shortest button, a fastest button, an easy button, an HOV use route button, or an HOV nonuse route button formed on the screen. After the user selects one route by pushing down one of these buttons, the user pushes down a guidance start button to make the navigation apparatus start a route guidance about the selected route.

As previously explained, the navigation apparatus in accordance with Embodiment 2 of the present invention is constructed in such away as to display the shortest route, the fastest route, and an easy route which the navigation apparatus has searched for on the basis of the following search conditions: fastest route search, shortest route search, and easy route search, in addition to a route which uses a car pool lane and a route which does not use any car pool lane, on a single screen, and enable the user to select a desired route from the plurality of displayed routes. Therefore, the user-friendliness of the navigation apparatus can be improved.

INDUSTRIAL APPLICABILITY

As mentioned above, the navigation apparatus in accordance with the present invention is constructed in such a way as to perform both a route search with car pool lanes being made usable between the current position of the vehicle and the destination, and a route search with car pool lanes being made unusable, and switch between a route which uses a car pool lane and a route which does not use any car pool lane according to an instruction from an input means. Therefore, because the user can acquire a route having a high degree of travel efficiency promptly according to the traffic state, the navigation apparatus in accordance with the present invention is suitable for use in a vehicle-mounted navigation system intended for an area in which a road system, such as a car pool lane system, is adopted.

The invention claimed is:

1. A navigation apparatus comprising:
a current position detector that detects a current position;
an input unit;
a search condition setting unit that sets up search conditions which include one of a fastest route, a shortest route and an easy route;
a route searching unit that performs both a route search with car pool lanes being made usable between the current position detected by said current position detector and a destination entered using said input unit, and a route search with car pool lanes being made unusable, according to one of the search conditions set up by said search condition setting unit and according to a one-time instruction to perform a route search which is entered using said input unit;
a storage that stores route data on routes acquired through the route searches by said route searching unit, said route data comprising a first route which uses a car pool lane and a second route which does not use any car pool lane;
a display configured to display a selected one of said first and second routes; and
a controller that performs guidance along the selected route when a vehicle starts traveling along the selected route and, when an instruction is inputted to the input unit, causes said display to switch from displaying said selected route to displaying the other route of said first and second routes and performs guidance about said other route.

2. The navigation apparatus according to claim 1, wherein the route searching unit performs both the route search with car pool lanes being made usable between the current position detected by said current position detector and the destination inputted by said input unit, and the route search with car pool lanes being made unusable according to another search condition which can be set up by the search condition setting unit, other than said one of the search conditions set up by said search condition setting unit.

3. The navigation apparatus according to claim 1, wherein said navigation apparatus has an output unit that, in a case in which a route which uses a car pool lane exists in the routes acquired through the route searches by the route searching unit, outputs a message showing that a route which uses a car pool lane exists in the routes.

4. The navigation apparatus according to claim 1, wherein the route searching unit searches for the route which uses a car pool lane by using, as a search condition, positions of car pool lanes, a number of passengers, lanes, a vehicle type, days of week, a time zone, or a toll fee.

5. The navigation apparatus according to claim 2, wherein the display displays a route based on route data acquired through the route search according to the search condition.

6. The navigation apparatus according to claim 1, further comprising a map matching unit that carries out a matching process of reading a map data comprising information regarding the route which uses a car pool lane or the route which does not use any car pool lane, and superimposes a vehicle position mark on a map at a position corresponding to the current position data received from the current position detector based on said map data.

7. The navigation apparatus according to claim 1, wherein when said route button which uses a car pool lane is selected, the display displays a route which uses said car pool lane without displaying a route which does not use any car pool lane.

8. The navigation apparatus according to claim 1, wherein when said route button which does not use a car pool lane is selected, the display displays a route which does not use said car pool lane without displaying a route which uses a car pool lane.

\* \* \* \* \*